United States Patent
Brown et al.

(10) Patent No.: US 9,800,518 B2
(45) Date of Patent: Oct. 24, 2017

(54) MANAGING APPLICATION, MIDDLEWARE, AND VIRTUAL MECHANISM DENSITY IN A CLOUD

(71) Applicant: INTERNATIONAL BUSINESS MACHINES CORPORATION, Armonk, NY (US)

(72) Inventors: Kyle G. Brown, Apex, NC (US); Lei He, Beijing (CN); Eric N. Herness, Byron, MN (US); Andre Tost, Rochester, MN (US); Xue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 14/644,886

(22) Filed: Mar. 11, 2015

(65) Prior Publication Data

US 2016/0269311 A1    Sep. 15, 2016

(51) Int. Cl.
*H04L 12/913*    (2013.01)
*H04L 12/931*    (2013.01)
(Continued)

(52) U.S. Cl.
CPC .............. *H04L 47/724* (2013.01); *G06F 9/50* (2013.01); *G06F 9/5027* (2013.01);
(Continued)

(58) Field of Classification Search
CPC .............. H04L 47/724; H04L 41/0806; H04L 67/1089; H04L 49/355; H04L 41/044;
(Continued)

(56) References Cited

U.S. PATENT DOCUMENTS 7,739,348 B2    6/2010    Becker
8,424,059 B2    4/2013    Kwok et al.
(Continued)

OTHER PUBLICATIONS

D. Palma et al., "Topology and Orchestration Specification for Cloud Applications Version 1.0", Nov. 25, 2013, OASIS Standard, http://docs.oasis-open.org/tosca/TOSCA/v1.0/os/TOSCA-v1.0-os.html, pp. 1-113.

(Continued)

*Primary Examiner* — Abdulkader M Alriyashi
(74) *Attorney, Agent, or Firm* — Law Office of Jim Boice

(57) ABSTRACT

A method, system, and/or computer program product configures hierarchical cloud resources. A supervisor server receives a signal indicating a boundary of a set of hierarchical cloud resources. The boundary describes a level of resource sharing among the set of hierarchical cloud resources, which includes a set of software applications, a set of middleware that supports one or more software applications from the set of software applications, and a set of virtual mechanisms that supports one or more middleware from the set of middleware. The supervisor server receives a signal from one or more Isolation/Density (I/D) switches, which are associated with one or more software applications from the set of software applications and one or more middleware from the set of the middleware, and then configures the hierarchical cloud resources, according to the boundary of the set of hierarchical cloud resources, and according to settings of the I/D switches.

20 Claims, 7 Drawing Sheets

(51) Int. Cl.
  *H04L 29/08* (2006.01)
  *H04L 12/24* (2006.01)
  *G06F 9/50* (2006.01)

(52) U.S. Cl.
  CPC .......... *G06F 9/5061* (2013.01); *G06F 9/5077* (2013.01); *H04L 41/0806* (2013.01); *H04L 49/355* (2013.01); *H04L 67/1089* (2013.01); *H04L 41/044* (2013.01)

(58) Field of Classification Search
  CPC ........ G06F 9/5077; G06F 9/50; G06F 9/5027; G06F 9/5061
  See application file for complete search history.

(56) References Cited

U.S. PATENT DOCUMENTS

| | | | |
|---|---|---|---|
| 2007/0226719 | A1 | 9/2007 | Park et al. |
| 2008/0034370 | A1* | 2/2008 | Huizenga .............. G06F 9/5011 718/104 |
| 2009/0158275 | A1 | 6/2009 | Wang et al. |
| 2010/0235482 | A1 | 9/2010 | Chalupa et al. |
| 2012/0159523 | A1 | 6/2012 | Kulkarni et al. |
| 2012/0324069 | A1 | 12/2012 | Nori et al. |
| 2013/0326064 | A1* | 12/2013 | Gulati .................. G06F 9/5061 709/226 |
| 2015/0212856 | A1* | 7/2015 | Shanmuganathan . G06F 9/5027 709/226 |

OTHER PUBLICATIONS

D. Amrhein, "Exploring Cloud Deployment Models in IBM Workload Deployer", dustinamrhein.wordpress.com, May 10, 2011, pp. 1-4.

Y. Song et al., "Multi-Tiered On-Demand Resource Scheduling for VM-Based Data Center", IEEE, CCGRID '09 Proceedings of the 2009 9th IEEE/ACM International Symposium on Cluster Computing and the Grid, pp. 148-155.

X. Meng et al., "Efficient Resource Provisioning in Compute Clouds via VM Multiplexing", ACM, ICAC'10, 2010, pp. 1-10.

K. Bakshi et al., "Considerations for Cloud Data Centers: Framework, Architecture and Adoption", IEEE, Aerospace Conference, 2011, pp. 1-7.

Docker, Inc., "What is Docker?" Docker, Inc., <https://www.docker.com/whatisdocker/>, retrieved Jan. 29, 2015, pp. 1-3.

Anonymous, "LinuxContainers.org: Infrastructure for container projects", Linux Containers, <https://linuxcontainers.org>, retrieved Jan. 29, 2015, pp. 1-2.

* cited by examiner

US 9,800,518 B2

MANAGING APPLICATION, MIDDLEWARE, AND VIRTUAL MECHANISM DENSITY IN A CLOUD

BACKGROUND

The present disclosure relates to the field of cloud resources, and specifically to the field of hierarchical cloud resources. Still more specifically, the present disclosure relates to hierarchical cloud resources that include applications, middleware that supports the applications, and virtual mechanisms, such as virtual machines and containers, that support the middleware and applications.

SUMMARY

A method, system, and/or computer program product configures hierarchical cloud resources. A supervisor server receives a signal indicating a boundary of a set of hierarchical cloud resources. The boundary describes a level of resource sharing among the set of hierarchical cloud resources, which includes a set of software applications, a set of middleware that supports one or more software applications from the set of software applications, and a set of virtual mechanisms that supports one or more middleware from the set of middleware. The supervisor server receives a signal from one or more Isolation/Density (I/D) switches, which are associated with one or more software applications from the set of software applications and one or more middleware from the set of middleware. The supervisor server configures the hierarchical cloud resources, according to the boundary of the set of hierarchical cloud resources, and according to settings of the one or more I/D switches, such that an application I/D switch from a specific software application controls whether or not a particular middleware is reserved for an exclusive use by the specific software application, and a middleware I/D switch from a specific middleware controls whether or not a particular virtual mechanism is reserved for an exclusive use by the specific middleware.

In one or more embodiments, an I/D switch is associated with a virtual machine (VM) and/or a container within a VM.

DETAILED DESCRIPTION

Figure 1:
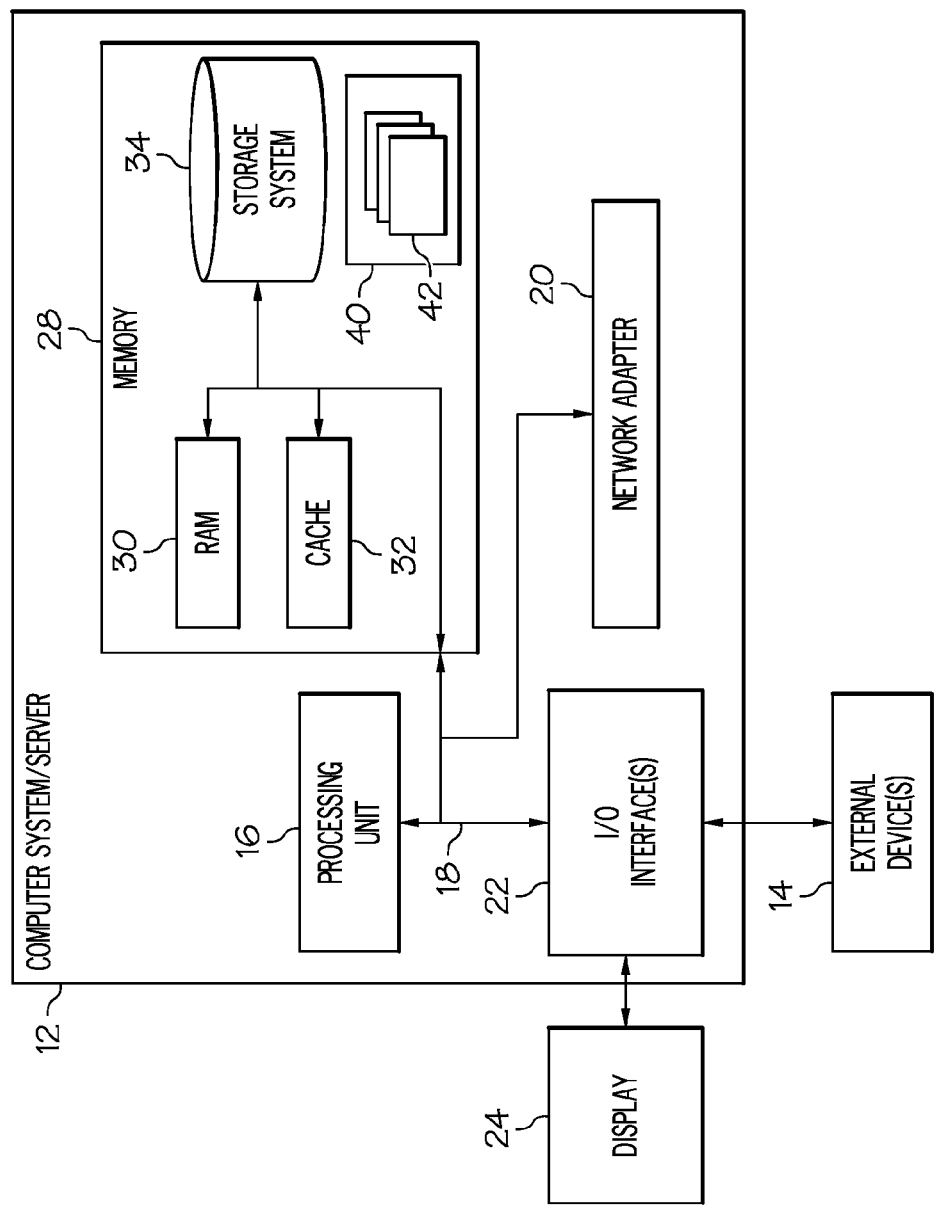
FIG. 1 depicts a cloud computing node according to an embodiment of the present disclosure.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
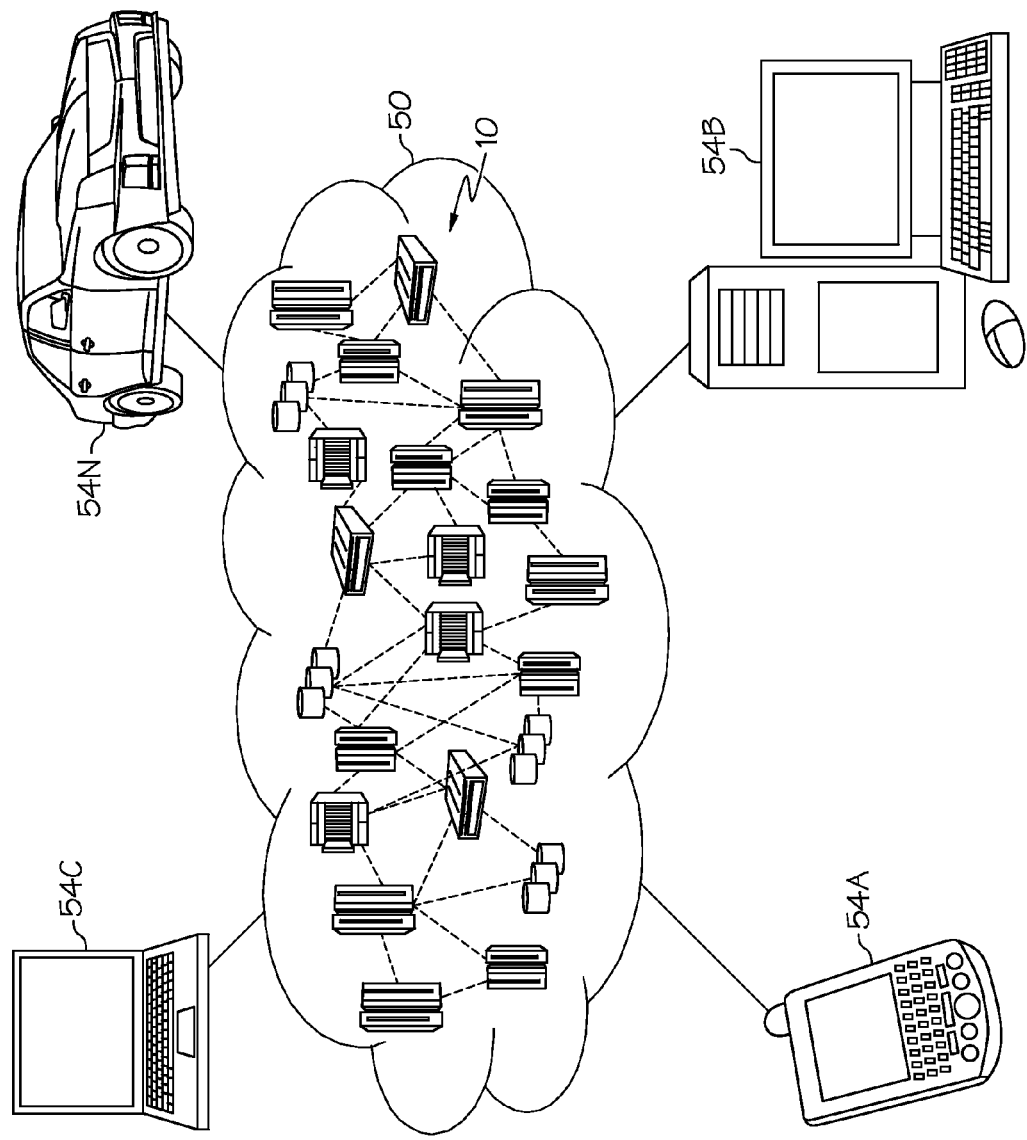
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 3:
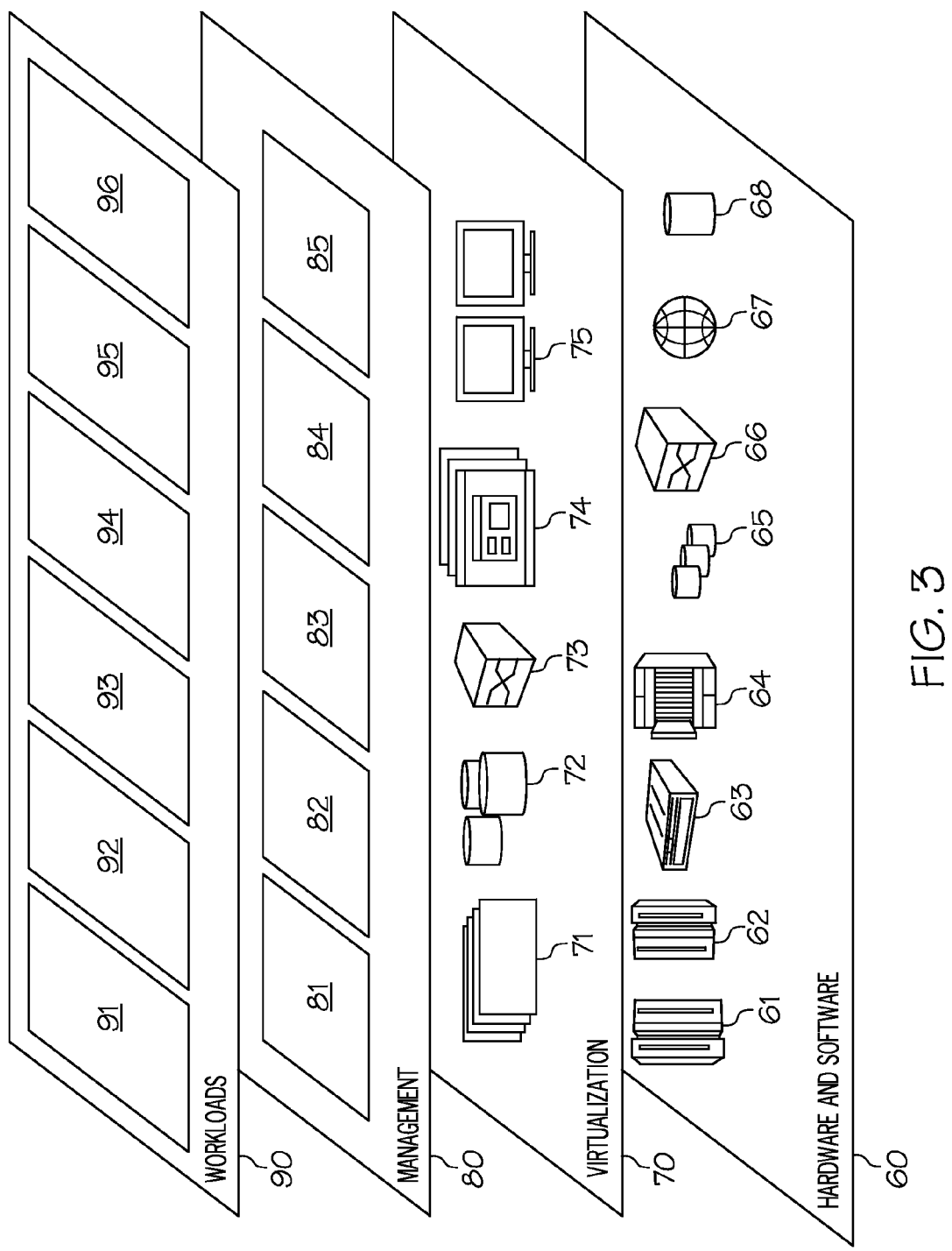
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hierarchical resource distributing processing 96.

Information Technology (IT) clouds are often used to host applications that are installed on top of "middleware". Middleware is software that provides an interface between one or more host applications (e.g., a word processing application, a graphics application, etc.) and resources that provide the landscape needed to run such host applications. In the context of a cloud that uses virtual machines (i.e., software that emulates physical computing devices such as physical hardware servers), such middleware provides 1) an interface between the host application(s) and 2) secondary resources that are needed by the host applications but are not provided by the virtual machines. For example, middleware may be software that is an application server that retrieves and deploys the host applications, database services that emulate a database server that accesses and retrieves data needed by the host applications, communication services that emulate communication resources that afford communication among the host applications, the virtual machines, the application server, the database server, etc.

Such middleware is deployed on top of virtual machines that are controlled by hypervisors. One problem area in the cloud deployment of such applications is the ratio of application solution elements versus the number of virtual machines that have to be created and hosted in the cloud.

At one end of this spectrum, each host application exists independently from other host applications, such that each host application has its own exclusive set of middleware components, which exist on their exclusive set of virtual machines. This provides excellent stability, since a failure by one system (i.e., a linear hierarchy of the host application, middleware and virtual machines) does not affect another system. However, the cost of such an isolated system is that such systems often underutilize resources (middleware, virtual machines) that are reserved for a particular host application, which may not be currently executing, which may be running a minimal number of operations, etc.

At the other end of the spectrum, multiple host applications may run on one (or less than the total number of the multiple host applications) node of middleware (i.e., the total number of host applications is greater than the number of nodes of middleware that they utilize). Similarly, multiple nodes of middleware may run on just one or two virtual machines. This frequently causes the underlying hardware/software that makes up the virtual machines to be overtaxed, often to the point of crashing. Thus, if a single node of middleware and/or a single virtual machine is used, multiple host applications that were running on them may be taken down.

The present invention presents one or more embodiments that provide an optimal balance of such resource usage by host applications. Specifically, the present invention presents a novel Isolation/Density (I/D) switch, which controls the exclusive/non-exclusive use of a lower-tiered resource in a host application—middleware—virtual mechanism hierarchy.

As described herein, the virtual mechanism is software that interfaces between middleware and a physical machine to support the use of a physical machine.

Figure 6:
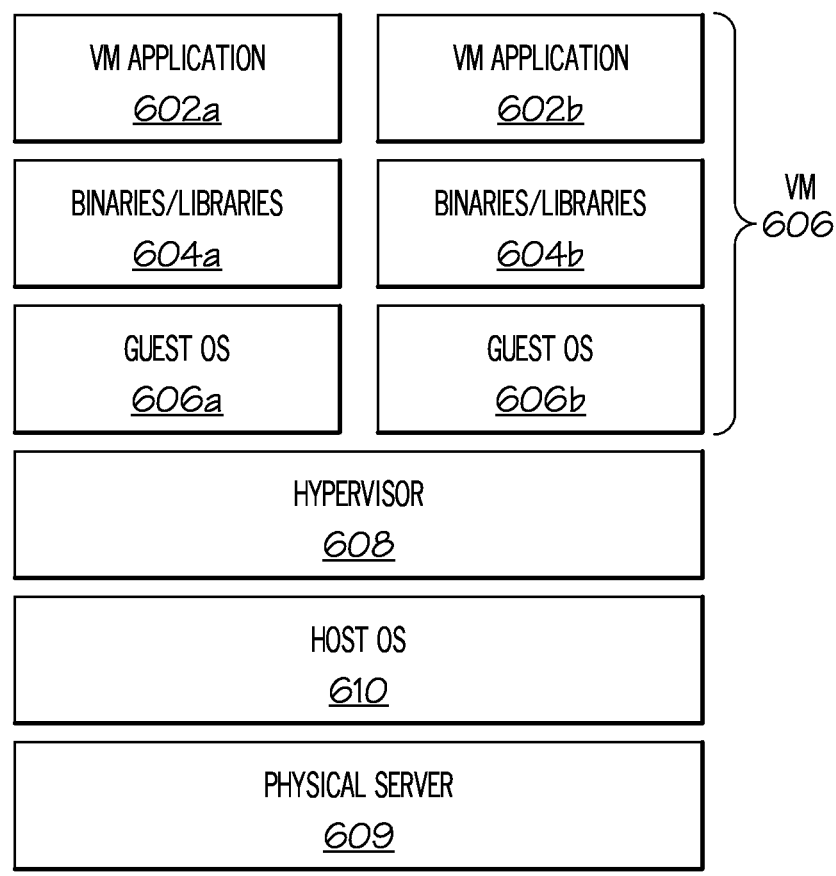
FIG. 6 illustrates additional detail of one or more of the virtual machines depicted in FIG. 5.

In one embodiment of the present invention, this virtual mechanism is a virtual machine, which is made up of a virtual machine application that, along with requisite binaries, libraries, and an operating system emulator, emulates a physical computer. Deployment of the virtual machine is under the control of a hypervisor, also known as a virtual machine monitor (VMM), which is a piece of computer software, firmware or hardware that creates, deploys, runs, and otherwise manages virtual machines. Additional detail of the embodiment is discussed below with respect to FIG. 6.

Figure 7:
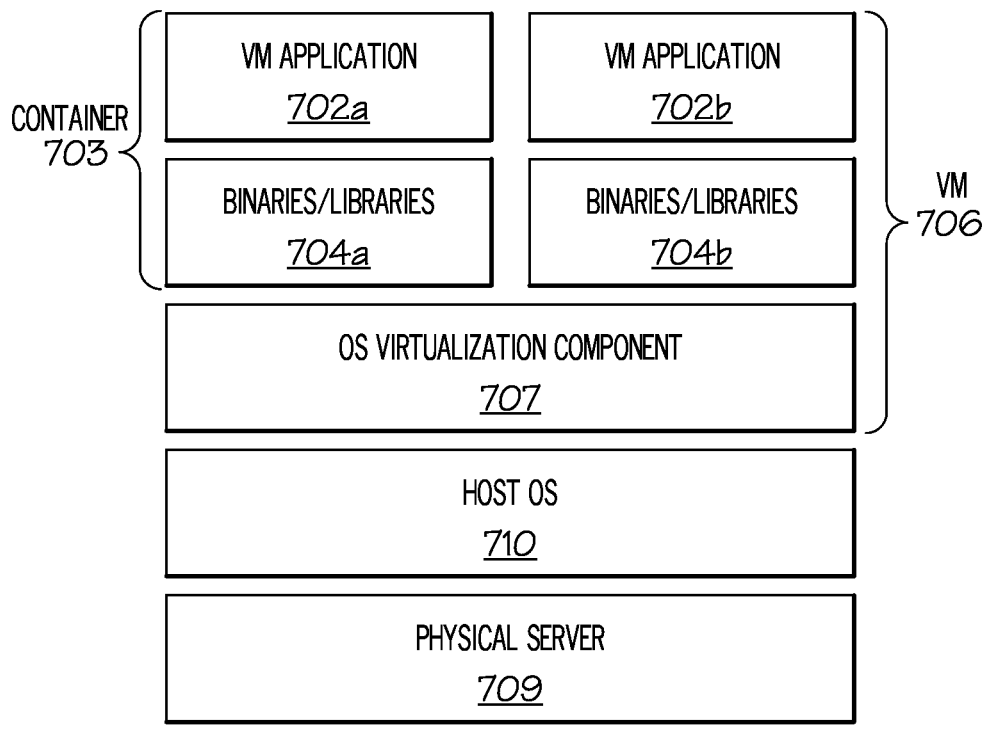
FIG. 7 depicts additional detail of one or more of the virtual machines depicted in FIG. 5 that utilize a container and operating virtualization component to create a virtual machine.

In one embodiment of the present invention, the virtual mechanism is either a virtual machine or a container that is used to construct the virtual machine. That is, in this embodiment the virtual machine includes a container that includes the virtual machine application, binaries, and libraries, as well as a portable operating system virtualization component that allows the virtual machine to be executed without the hypervisor. Additional detail of the embodiment is discussed below with respect to FIG. 7.

There are two extreme ways of distributing applications and the related middleware components across virtual machines/mechanisms in a cloud.

Completely Isolated State—At one extreme, resources are completed isolated. Each application gets its own exclusive set of middleware components, including not only application servers but also database servers and other servers that may be required (e. g. messaging servers), and each middleware component gets its own exclusive virtual machine/mechanism.

Maximum Density State—At the opposite extreme is maximum density. This state is reached if all of the components that form a solution are deployed on the absolute minimum number of virtual machine/mechanisms. This means that middleware servers such as application servers and database servers will be co-hosted on the same virtual machine (VM), or that applications are deployed onto the same middleware servers. In an extreme case, this means that initially only two VMs are deployed, and all middleware and applications get installed until the VMs run out of available memory.

As described herein, the present invention controls the ratio of applications, middleware components and virtual machines with each other on a rolling scale. The endpoints of this scale are the Complete Isolated and Maximum Density states described above.

Figure 4:
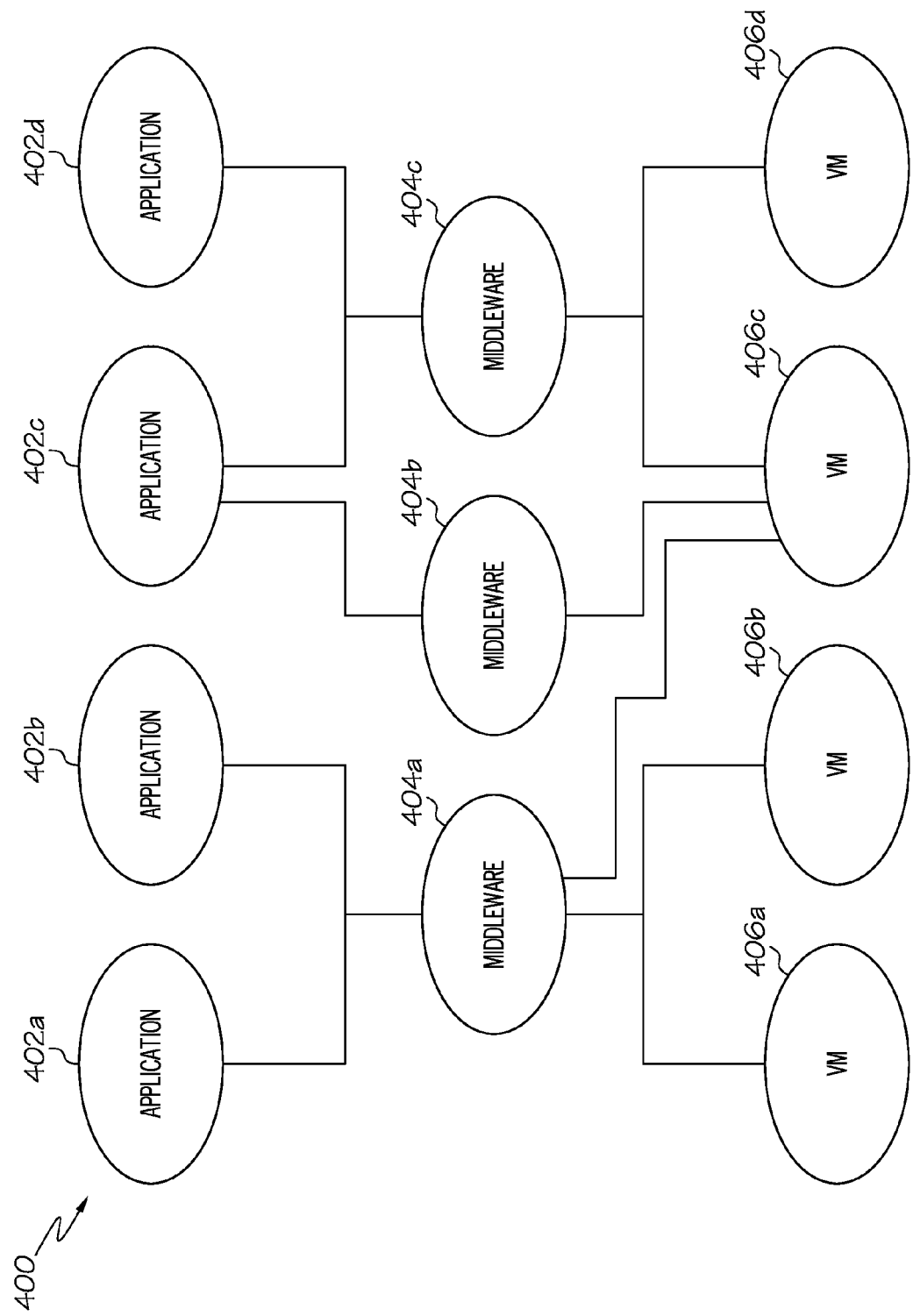
FIG. 4 illustrates a relationship among applications, middleware, and virtual machines in a cloud environment according to one or more embodiments of the present invention.

With reference now to FIG. 4, a relationship among applications 402a-402d, middleware 404a-404d, and virtual machines 406a-406d in a cloud environment 400 according to one or more embodiments of the present invention is presented.

As shown in cloud environment 400 in FIG. 4, multiple applications (applications 402a-402d) are associated with one or more middleware components (middleware 404a-404d), which in turn are associated with one or more virtual machines (virtual machines 406as-406d).

Applications 402a-404d are host applications, which in one or more embodiments are software applications that are available on-demand (e.g., in a Service Oriented Architecture—SOA), which allows customers to "rent" the software applications as needed. Such software applications are made available to the customer via a "cloud" of computing resources, such as servers, networks, applications, etc., which are remotely located from the consumer but are nonetheless available to the consumer via a network. Such a "cloud", which may be public (in which any customer may access the resources within the cloud), private (in which only one enterprise/customer is allowed to access the resources within the cloud), or hybrid (which contains both public resources and private resources), allows centralized data storage and online access to computer services and/or resources.

The middleware components (middleware 404a-404d) are software components. For example, assume that application 402a is a web server that serves a webpage for a retail store. In order to provide application 402a to a customer, several resources are needed. First, the application 402a itself is needed. Second, access to a network used to transmit/serve the webpage is needed. Third, a database of prices and descriptions of items shown on the webpage is needed. Middleware 404a is software that provides the first and third resources (the application and data needed to support the application), while the virtual machine provides the second resource (access to the network).

While middleware 404a is depicted as a single node in FIG. 4, it is to be understood that middleware 404a may be one or more software resources needed to support application 402a.

As shown in FIG. 4, application 402a runs on three virtual machines (VMs), depicted as virtual machines 406a-406c. Virtual machines 406a-406c provide computing power needed to execute application 402a, along with the resources provided by middleware 404a. In one embodiment, each virtual machine is devoted to a particular aspect of middleware 404a. For example, virtual machine 406a may provide the processing power needed by the application server component of middleware 404a, virtual machine 406b may provide the processing power needed by the communication port component of middleware 404a, and virtual machine 406c may provide the processing power needed by the database server component of middleware 404a.

Alternatively, resources provided by virtual machines 406a-406c in support of middleware 404a may be combined. For example, virtual machine 406a may provide resources needed to support the application server component and the communication port component of middleware 404a, virtual machine 406b may provide the processing power needed by the database server component of middleware 404a, and virtual machine 406c may be a backup (failover) virtual machine that handles overflow of work and/or replaces virtual machine 406a or virtual machine 406b if one or both should fail. As noted above, one or more of the virtual machines 406a-406d also provide connections to shared hardware resources such as networks, storage, etc., as well as the emulated computers on which the virtual machines 406a-406d run.

Figure 5:
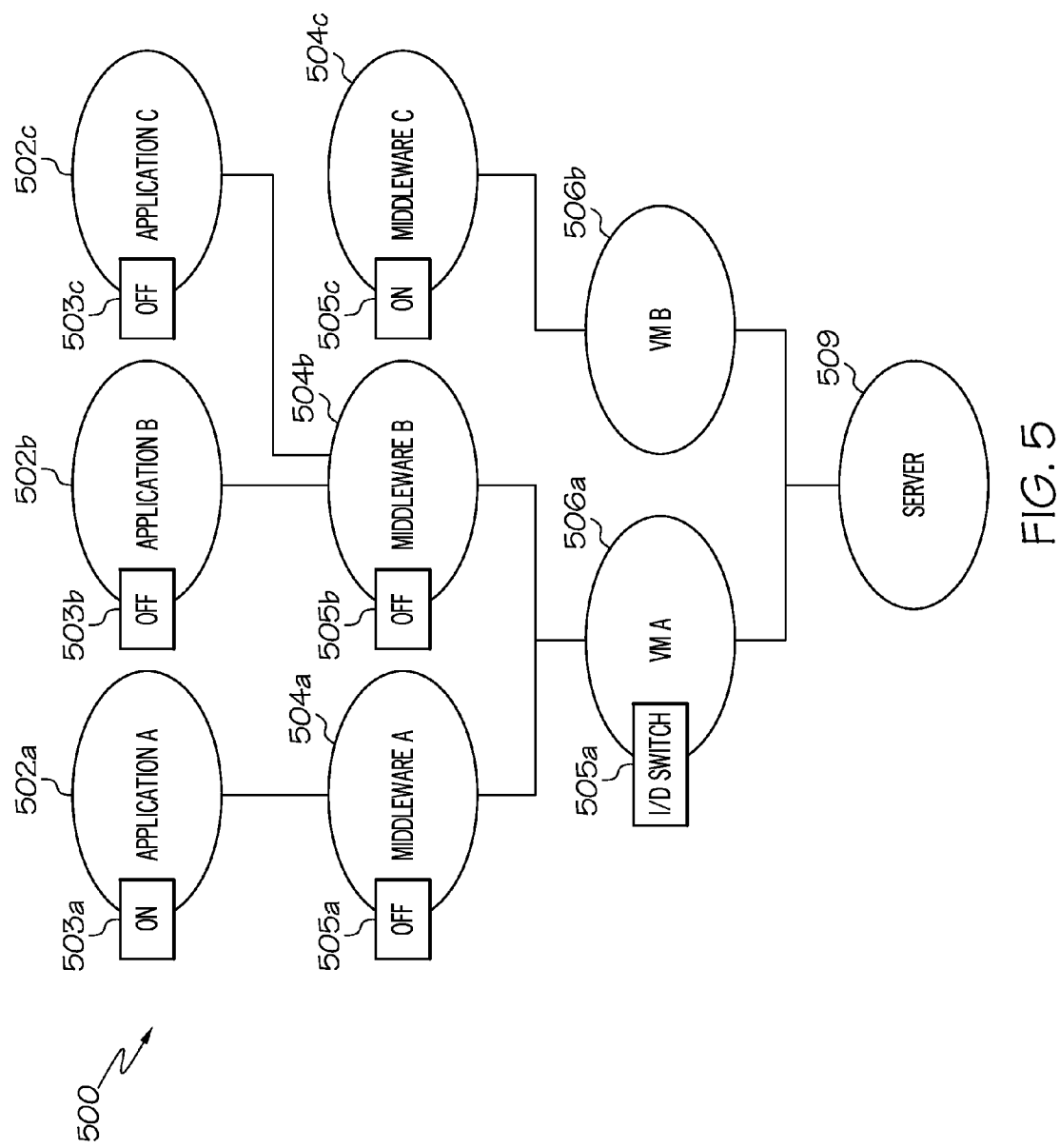
FIG. 5 depicts a relationship among applications, middleware, and virtual machines after Isolation/Density (I/D) Switches are turned on or off in the applications and/or middleware to control usage of lower-tiered resources.

With reference now to FIG. 5, a relationship among applications, middleware, and virtual machines after Isolation/Density (I/D) Switches are turned on or off in the applications and/or middleware to control usage of lower-tiered resources is presented. As described herein, applications I/D switches 503a-503c control whether or not lower-tiered middleware 504a-504c are used exclusively by a particular application from host applications 502a-502c; middleware I/D switches 505a-505c control whether or not lower-tiered virtual mechanisms (including, but not limited to virtual machines 506a-506b) are used exclusively by a particular middleware from middleware 504a-504c; and virtual mechanism I/D switch controls whether or not lower-tiered physical servers (e.g., server 509) are used exclusively by a particular virtual mechanism (e.g., one of the virtual machines 506a-506b).

One or more embodiments of the present invention presented herein utilize a novel and useful set of switches that can be turned on or off, and which control the density of the deployed solution. As shown FIG. 5, a hierarchy of elements in cloud environment 500, analogous to and including one or more elements shown and described in cloud environment 400 in FIG. 4, is presented. As shown in FIG. 5, each resource (or alternatively, some of the resources) in the hierarchy of resources has an "Isolation/Density Switch" (I/D switch) defined on it. If this I/D switch is turned to "On", then the associated element (i.e., the node to which the switch is devoted) exclusively "owns" the element it is connected to on the next lower level of the hierarchy. Similarly, if the I/D switch is turned to "Off", the lower level element can be shared with other siblings.

As shown for exemplary purposes in FIG. 5, host applications 502a-502c each have their own respective Isolation/Density (I/D) switch from application I/D switches 503a-503c. Respectively, middleware 504a-504c each have their own respective I/D switch from middleware I/D switches 505a-505c.

Assume now that the application I/D switch 503a for a Web Application (i.e., application 502a) is turned to "On" (as depicted). In response to application I/D switch 503a being turned to "On", the middleware 504a (e.g., an application server) to which application 502a is linked to will run only this (web) application, and nothing else. Conversely, if the application I/D switch 503b for an application such as application 502b is turned to "Off" (as depicted), then it shares its middleware 504b (e.g., an application server) with other applications (e.g., application 502c).

Similarly, if middleware 504a has its middleware I/D switch 505a turned to "On" (not depicted), it will exclusively own the VM 506a that it is running on. Conversely, if middleware 504a has its middleware I/D switch 505a turned to "Off" (as depicted), then other middleware (e.g., middleware 504b) can also use virtual machine 506a.

The I/D switches depicted in FIG. 5 can be set independently on multiple levels. For example, application I/D switch 503a for application 502a may be set to "On", whereas middleware I/D switch 505a for a middleware such as an application server depicted as middleware 504a is set to "Off". Thus, not only can resources at different hierarchical levels be independently set to determine whether or not they share lower-hierarchical resources, but each individual resource itself can be set independently to determine whether or not they share lower-hierarchical resources by using the I/D switches described herein.

While FIG. 5 presents an example of how a collection of I/D switches influences how applications and middleware are distributed across VMs, similar I/D switches may also be applied to the VMs. For example, assume that VM 506a runs on a server 509. Assume further that VM 506a has a virtual machine I/D switch 507. If the virtual mechanism I/D switch 507 is set to "On", then server 509 is only allowed to support VM 506a (and not VM 506b). However, if virtual mechanism I/D switch 507 is set to "Off", then server 509 can support both VM 506a as well as VM 506b.

Density and Multi-Tenancy

In one or more embodiments of the present invention, an additional degree of density can be reached within an application when taking into consideration the consumers (i.e., tenants) of an application. Most applications are available to many users, which either act individually (e.g., an online banking application exposed via a bank's website), or as a group (e.g., for different mobile applications leveraging a currency exchange application). In either case, an application can be built in a way that isolates tenants from each other, thus it can be multi tenancy-enabled. This enablement can happen in many ways, such as by giving each tenant his or her own database, or by allocating objects in a cache for each tenant.

By utilizing the I/D switches described herein, tenancy can be dynamically controlled by a supervising entity. For example, assume that the resources shown in FIG. 5, that are managed by a supervisor server such as the cloud computing node 10 shown in FIG. 1, and the external device(s) 14 in FIG. 4, are the applications 502a-502c, middleware 504a-504c, VMs 506a-506b, and/or server 509 shown in FIG. 5. By selectively turning the I/D switches shown in FIG. 5 off and on, the supervisor server can not only define the level of sharing of resources from the perspective of the resources themselves, but can also define the level of sharing of resources from the perspective of the consumers/tenants.

Internal VM Density

Another aspect of density management using the I/D switches depicted in FIG. 5 lies within the virtual machine (e.g., VM 506a) itself. While middleware components, including the applications that are deployed on it, may run in isolation from each other on a virtual machine level, software components running on the same VM can be configured to share resources beyond memory, CPU and the guest OS.

While the present invention has been described thus far as using middleware I/D switches (e.g., middleware I/D switches 506a-506c in FIG. 5) to control the exclusive/non-exclusive use of a lower-tiered virtual machine, such middleware I/D switches can also be used to control other lower-tiered virtual components.

For example, consider the virtual machine 606 (analogous to one or more of the virtual machines 506a-506b shown in FIG. 5). As depicted, virtual machine 606 is composed of one or more virtual applications 602a-602b, which are software applications that create the general framework of a virtual machine that emulates a physical server (e.g., physical server 609 in FIG. 6). In order to implement/execute the virtual machine application(s) 602a-602b, binaries (executable object code) and libraries (collections of prewritten code) from binaries/libraries 604a-604b are executed/retrieved. Finally, the executing binaries run on a virtual operating system, shown as guest operating system(s) 606a-606b, which is a complete copy of the host operating system 610 that is actually running on the physical server 609. Deployment of the virtual machine 606 is managed by a hypervisor 608, which is software that interfaces between the virtual machine 606 and the host operating system 610 running on the physical server 609.

However, the granularity of the virtual mechanism that is selectively being used exclusively or non-exclusively by the middleware may be at an even finer level, particularly if containers are used. For example, consider now FIG. 7, which depicts a virtual machine 706 that is made up of a container 703 and an operating system virtualization component 707. As shown, the container 703 includes virtual application(s) 702a-702b (analogous to virtual application(s) 602a-602b in FIG. 6) and binaries/libraries 704a-704b (analogous to binaries/libraries 604a-604b shown in FIG. 6). However, virtual machine 706 includes an operating system virtualization component 707 that is able to provide an interface to the host operating system 710 for physical server 709 (without requiring that the virtual machine 706 contain a copy of the host operating system 710, as is achieved by the guest operating system(s) 606a-606b shown in FIG. 6), but also takes on the role of the hypervisor 608 shown in FIG. 6. Therefore, not only is virtual machine 706 smaller (since it does not include a guest copy of the host operation system 710), but it is also more portable, since it does not require permission from a hypervisor 608 to run on the host operating system 710 and physical server 709.

In addition to being smaller and more portable, the virtual machine 706 allows finer granularity to occur when using middleware I/D switches. That is, container 703 may be used by multiple virtual machines, not just the virtual machine 706 shown in FIG. 7. As such, a middleware I/D switch may control whether a particular container 703 is used exclusively or non-exclusively by a particular middleware. In this embodiment, the middleware I/D switch is applied to multiple virtual machines, rather than just the VM 706 shown in FIG. 7. Thus, middleware I/D switches 505a-505c shown in FIG. 5 are able to selectively control various types of virtual mechanisms, including virtual machines (e.g., virtual machine 706 shown in FIG. 7), containers (e.g., container 703 shown in FIG. 7), and/or container support mechanisms (e.g., operating virtualization component 707 shown in FIG. 7). That is, in one or more embodiments, a virtual machine may have its own I/D switch, a container may have its own I/D switch, and a container support mechanism may have its own I/D switch, thus providing additional fine control supported by these various/different/distinct I/D switches.

Figure 8:
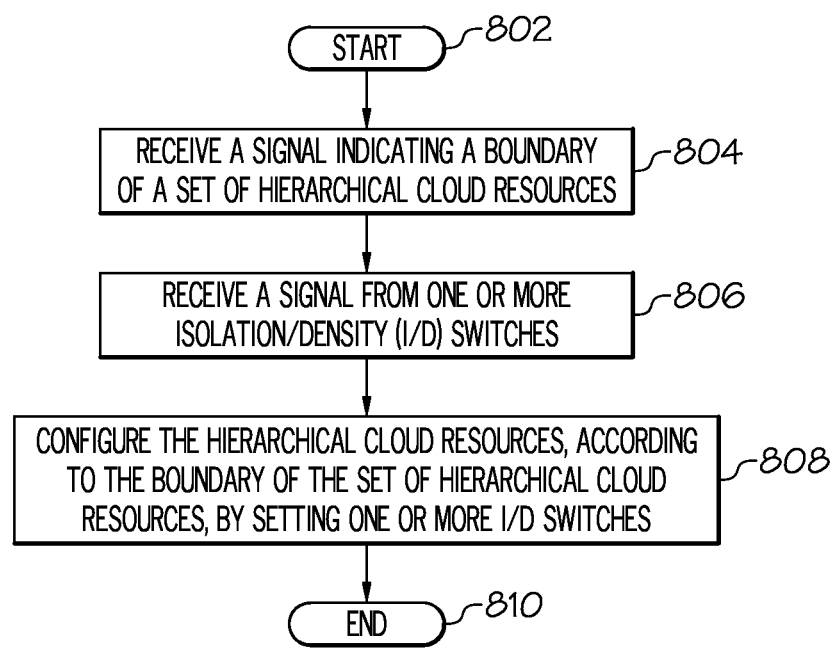
FIG. 8 is a high-level flow-chart of one or more operations performed by one or more processors and/or other hardware devices to manage a hierarchy of applications, middleware, and virtual machine density on a cloud.

With reference now to FIG. 8, a high-level flow-chart of one or more operations performed by one or more processors and/or other hardware devices to manage a hierarchy of applications, middleware, and virtual machine/mechanism density on a cloud is presented.

After initiator block 802, a supervisor server (e.g., cloud computing node 10 shown in FIG. 1) receives a signal indicating a boundary of a set of hierarchical cloud resources (e.g., elements 502a-502c, 504a-504c, 506a-506b, and/or 509 shown in FIG. 5), as depicted in block 604. The boundary describes a level of resource sharing among the set of hierarchical cloud resources. As described herein, the set of hierarchical cloud resources comprises a set of software applications (e.g., applications 502a-502c in FIG. 5), a set of middleware (e.g., middleware 504a-504c in FIG. 5) that supports one or more software applications from the set of software applications, and a set of virtual machine/mechanisms (e.g., virtual machines 506a-506b in FIG. 5) that supports one or more middleware from the set of middleware.

In one embodiment of the present invention, the signal comes from an individual that subjectively decides how isolated or dense the cloud resources are. For example, a user of an external device (e.g., external device 14 shown in FIG. 1) may indicate that he/she wants the cloud resources to be set at level "1" on a scale of 1-10, where level 1 indicates that there is no sharing (completely "isolated") of resources and level 10 indicates that there is unfettered sharing of resources (totally "dense").

In one embodiment of the present invention, the signal comes from hardware that determines how isolated/dense the system is to be. For example, sensors may determine that a particular physical machine that supports a particular virtual machine has historically become overloaded when shared by multiple virtual machines. Thus, a supervisor server/computer may set the Isolation/Density (I/D) switches on the virtual machines described herein to "On", such that only one virtual machine can run on that particular physical machine.

As described in block 806, the supervisor server receives a signal from one or more Isolation/Density (I/D) switches. As shown in the example depicted in FIG. 5, one or more I/D switches (e.g., application I/D switches 503a-503c) are associated with one or more software applications from the set of software applications (e.g., applications 502a-502c). Similarly, one or more I/D switches (e.g., middleware I/D switches 505a-505c in FIG. 5) are associated with one or more middleware from the set of the middleware (e.g., middleware 504a-504c). Similarly, the supervisor server can further configure the hierarchical cloud resources according to settings on an I/D switch (e.g., virtual mechanism I/D switch 507 in FIG. 5) on one or more virtual machine/mechanisms from the virtual machine/mechanisms (e.g., virtual machines 506a-506b in FIG. 5), such that the I/D switch on a specific virtual machine controls whether or not a particular physical computer (e.g., server 509 in FIG. 5) is reserved for an exclusive use by the specific virtual machine.

The I/D switches described herein may be set by the supervisor server or by other logic. For example, the I/D switches may be set by the supervisor server determining how they should be set according to rules of preferences regarding how isolated/exclusive the resources should be. Alternatively, the I/D switches may be set according to signals generated by the host application. For example, if a particular host application is deemed to be "mission critical" (according to a flag set in the host application), then most I/D switches described herein would be turned to "On".

As described in block 808 in FIG. 8, the supervisor server configures the hierarchical cloud resources according to the boundary of the set of hierarchical cloud resources and the settings on the one or more I/D switches. As described herein an I/D switch (e.g., I/D switch 503a in FIG. 5) from a specific software application (e.g., application 502a in FIG. 5) controls whether or not a particular middleware (e.g., middleware 504a in FIG. 5) is reserved for an exclusive use by the specific software application, an I/D switch (e.g., I/D switch 505a in FIG. 5) from a specific middleware (e.g., middleware 504a in FIG. 5) controls whether or not a particular virtual machine (e.g., virtual machine 506a in FIG. 5) is reserved for an exclusive use by the specific middleware, and the I/D switch (e.g., I/D switch 507 in FIG. 5) on a specific virtual machine (e.g., virtual machine 506a in FIG. 5) controls whether or not a particular physical computer (e.g., server 509 in FIG. 5) is reserved for an exclusive use by the specific virtual machine.

The flow-chart depicted in FIG. 8 ends at terminator block 810.

Thus, described herein in one or more embodiments is a mechanism that allows resource distribution to be managed on a defined scale and for each application and/or middleware and/or virtual machine individually. The method and system described herein adds a set of I/D switches that can be turned on or off, thereby controlling density of the deployed solution. This approach is simple, and does not require changes to the underlying Infrastructure As A Service (IAAS) layer, which does not allow resources to be configured at the application level.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the present invention in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present disclosure of the present application in detail and by reference to illustrative embodiments thereof, it will be apparent that modifications and variations are possible without departing from the scope of the present disclosure defined in the appended claims.

What is claimed is:

1. A method of configuring hierarchical cloud resources, the method comprising:
    receiving, by a supervisor server, a signal indicating a boundary of a set of hierarchical cloud resources, wherein the boundary describes a level of resource sharing among the set of hierarchical cloud resources, wherein the set of hierarchical cloud resources comprises a set of software applications, a set of middleware that supports one or more software applications from the set of software applications, and a set of virtual mechanisms that supports one or more middleware from the set of middleware;
    receiving, by the supervisor server, a signal from one or more Isolation/Density (I/D) switches, wherein the one or more I/D switches are associated with one or more software applications from the set of software applications and one or more middleware from the set of the middleware; and
    configuring, by the supervisor server, the hierarchical cloud resources according to the boundary of the set of hierarchical cloud resources and according to settings of said one or more I/D switches, wherein an application I/D switch from a specific software application controls whether or not a particular middleware is reserved for an exclusive use by the specific software application, and wherein a middleware I/D switch from a specific middleware controls whether or not a particular virtual mechanism is reserved for an exclusive use by the specific middleware.

2. The method of claim 1, further comprising:
    further configuring, by the supervisor server, the hierarchical cloud resources by setting a virtual mechanism I/D switch on one or more virtual mechanisms from the set of virtual mechanisms, wherein the virtual mechanism I/D switch on a specific virtual mechanism controls whether or not a particular physical computer is reserved for an exclusive use by the specific virtual mechanism.

3. The method of claim 1, wherein the virtual mechanism is a virtual machine that comprises a virtual machine application, binaries, libraries, and a guest operating system for emulating a physical computer.

4. The method of claim 1, wherein the virtual mechanism is a virtual machine that comprises a container and an operating virtualization component, wherein the container comprises a virtual machine application, binaries, and libraries used to emulate a physical computer, and wherein the operating virtualization component emulates an operating system used by the physical computer.

5. The method of claim 1, wherein the virtual mechanism is a container that comprises a virtual machine application, binaries, and libraries used to emulate a physical computer.

6. The method of claim 1, wherein one or more middleware from the set of middleware is a software application server that delivers a software application from the set of software applications in the set of hierarchical cloud resources.

7. The method of claim 1, wherein one or more middleware from the set of middleware is a software communication port that provides access to a hardware network needed by one or more software applications in the set of hierarchical cloud resources.

8. A computer program product for configuring hierarchical cloud resources, the computer program product comprising a computer readable storage medium having program code embodied therewith, wherein the computer readable storage medium is not a transitory signal per se, and wherein the program code is readable and executable by a processor to perform a method comprising:
    receiving a signal indicating a boundary of a set of hierarchical cloud resources, wherein the boundary describes a level of resource sharing among the set of hierarchical cloud resources, wherein the set of hierarchical cloud resources comprises a set of software applications, a set of middleware that supports one or more software applications from the set of software applications, and a set of virtual mechanisms that supports one or more middleware from the set of middleware;
    receiving a signal from one or more Isolation/Density (I/D) switches, wherein the one or more I/D switches are associated with one or more software applications from the set of software applications and one or more middleware from the set of the middleware; and
    configuring the hierarchical cloud resources according to the boundary of the set of hierarchical cloud resources and according to settings of said one or more I/D switches, wherein an application I/D switch from a specific software application controls whether or not a particular middleware is reserved for an exclusive use by the specific software application, and wherein a middleware I/D switch from a specific middleware controls whether or not a particular virtual mechanism is reserved for an exclusive use by the specific middleware.

9. The computer program product of claim 8, wherein the method further comprises:
further configuring the hierarchical cloud resources by setting a virtual mechanism I/D switch on one or more virtual mechanisms from the set of virtual mechanisms, wherein the virtual mechanism I/D switch on a specific virtual mechanism controls whether or not a particular physical computer is reserved for an exclusive use by the specific virtual mechanism.

10. The computer program product of claim 8, wherein the virtual mechanism is a virtual machine that comprises a virtual machine application, binaries, libraries, and a guest operating system for emulating a physical computer.

11. The computer program product of claim 8, wherein the virtual mechanism is a virtual machine that comprises a container and an operating virtualization component, wherein the container comprises a virtual machine application, binaries, and libraries used to emulate a physical computer, and wherein the operating virtualization component emulates an operating system used by the physical computer.

12. The computer program product of claim 8, wherein the virtual mechanism is a container that comprises a virtual machine application, binaries, and libraries used to emulate a physical computer.

13. The computer program product of claim 8, wherein one or more middleware from the set of middleware is a software application server that delivers a software application from the set of software applications in the set of hierarchical cloud resources.

14. The computer program product of claim 8, wherein one or more middleware from the set of middleware is a software communication port that provides access to a hardware network needed by one or more software applications in the set of hierarchical cloud resources.

15. A computer system comprising:
a processor, a computer readable memory, and a non-transitory computer readable storage medium;
first program instructions to receive a signal indicating a boundary of a set of hierarchical cloud resources, wherein the boundary describes a level of resource sharing among the set of hierarchical cloud resources, wherein the set of hierarchical cloud resources comprises a set of software applications, a set of middleware that supports one or more software applications from the set of software applications, and a set of virtual mechanisms that supports one or more middleware from the set of middleware;
second program instructions to receive a signal from one or more Isolation/Density (I/D) switches, wherein the one or more I/D switches are associated with one or more software applications from the set of software applications and one or more middleware from the set of the middleware; and
third program instructions to configure the hierarchical cloud resources according to the boundary of the set of hierarchical cloud resources and according to settings of said one or more I/D switches, wherein an application I/D switch from a specific software application controls whether or not a particular middleware is reserved for an exclusive use by the specific software application, and wherein a middleware I/D switch from a specific middleware controls whether or not a particular virtual mechanism is reserved for an exclusive use by the specific middleware; and wherein
the first, second, and third program instructions are stored on the non-transitory computer readable storage medium for execution by one or more processors via the computer readable memory.

16. The computer system of claim 15, further comprising:
fourth program instructions to further configure the hierarchical cloud resources by setting a virtual mechanism I/D switch on one or more virtual mechanisms from the set of virtual mechanisms, wherein the virtual mechanism I/D switch on a specific virtual mechanism controls whether or not a particular physical computer is reserved for an exclusive use by the specific virtual mechanism; and wherein
the fourth program instructions are stored on the non-transitory computer readable storage medium for execution by one or more processors via the computer readable memory.

17. The computer system of claim 15, wherein the virtual mechanism is a virtual machine that comprises a container and an operating virtualization component, wherein the container comprises a virtual machine application, binaries, and libraries used to emulate a physical computer, and wherein the operating virtualization component emulates an operating system used by the physical computer.

18. The computer system of claim 15, wherein the virtual mechanism is a container that comprises a virtual machine application, binaries, and libraries used to emulate a physical computer.

19. The computer system of claim 15, wherein one or more middleware from the set of middleware is a software application server that delivers a software application from the set of software applications in the set of hierarchical cloud resources.

20. The computer system of claim 15, wherein one or more middleware from the set of middleware is a software communication port that provides access to a hardware network needed by one or more software applications in the set of hierarchical cloud resources.

* * * * *